(12) United States Patent
Friedrich

(10) Patent No.: US 7,675,964 B2
(45) Date of Patent: Mar. 9, 2010

(54) METHOD FOR TRANSMITTING A PLURALITY OF INFORMATION SYMBOLS

(75) Inventor: Ulrich Friedrich, Ellhofen (DE)

(73) Assignee: Atmel Automotive GmbH, Heilbronn (DE)

(*) Notice: Subject to any disclaimer, the term of this patent is extended or adjusted under 35 U.S.C. 154(b) by 961 days.

(21) Appl. No.: 09/929,703

(22) Filed: Aug. 13, 2001

(65) Prior Publication Data

US 2002/0044595 A1 Apr. 18, 2002

(30) Foreign Application Priority Data

Oct. 13, 2000 (DE) .................. 100 50 878

(51) Int. Cl.
*H04B 1/38* (2006.01)

(52) U.S. Cl. ................... 375/219; 375/295

(58) Field of Classification Search ............ 375/219, 375/295

See application file for complete search history.

(56) References Cited

U.S. PATENT DOCUMENTS

| | | | | |
|---|---|---|---|---|
| 3,626,417 A | | 12/1971 | Everett | |
| 4,794,649 A | * | 12/1988 | Fujiwara | 455/9 |
| 5,377,183 A | * | 12/1994 | Dent | 370/335 |
| 5,832,022 A | * | 11/1998 | Scott | 375/142 |
| 5,946,293 A | * | 8/1999 | Beale et al. | 370/210 |
| 6,044,333 A | | 3/2000 | Stobbe et al. | |
| 6,404,755 B1 | * | 6/2002 | Schafer | 370/338 |
| 6,463,039 B1 | * | 10/2002 | Ricci et al. | 370/277 |
| 6,493,333 B1 | * | 12/2002 | Kim et al. | 370/342 |
| 6,570,842 B1 | * | 5/2003 | Landolsi | 370/210 |
| 6,671,468 B1 | * | 12/2003 | Pfeiffer | 398/197 |
| 6,771,694 B1 | * | 8/2004 | Baumgartner | 375/220 |
| 7,031,334 B1 | * | 4/2006 | Nikula et al. | 370/442 |
| 2002/0172160 A1 | * | 11/2002 | Moulsley | 370/252 |

FOREIGN PATENT DOCUMENTS

| | | |
|---|---|---|
| DE | 19744781 | 4/1999 |
| EP | 0 473 569 A2 | 3/1992 |
| FR | 2 718 307 A1 | 10/1995 |
| GB | 2 208 058 A | 2/1989 |
| WO | WO 9933237 A1 * | 7/1999 |

OTHER PUBLICATIONS

Hwang et al, Multi-H Phase-Coded Modulations with Asymmetric Modulation Indexes, Dec. 1989, IEEE Journal on Selected Areas in Communications, vol. 7, No. 9.*

(Continued)

*Primary Examiner*—Chieh M. Fan
*Assistant Examiner*—Freshteh N Aghdam
(74) *Attorney, Agent, or Firm*—Muncy, Geissler, Olds & Lowe, PLLC

(57) ABSTRACT

A plurality of information symbols are transmitted by a carrier wave by assigning different modulation indices to the individual information symbols. Thereby the modulated carrier wave carries information not only by the digitally encoded (modulated) data words but also by the different modulation indices used for successive intervals that thus also represent information symbols. This increases the data rate of a wireless communication. When used in passive identification systems, for example transponders, the transmission of the superimposed clock information eliminates the need for the clock generation logic in the receiver. The reduced energy consumption enables the communication distance to be increased.

26 Claims, 1 Drawing Sheet

OTHER PUBLICATIONS

Fonseka, Hybrid multi-h/multi-T continuous phase freqeuncy shift keying, Sep. 1999, vol. 35, No. 18, p. 1517-1519.*

Ho, Pilot Symbol-Assisted Detection of CPM Schemes Operating in Fast Fading Channels, Mar. 1996, IEEE Transactions on Communications, vol. 44, No. 3, p. 337-347.*

E. Hoelzler et al.; "Pulstechnik, Band I—Grundlagen", $2^{nd}$ Edition, prepared by R. Kersten et al.; Springer-Verlag, 1986, relevant pp. 219 to 249, 262 to 281, 291 to 299, 307, 308, 314, 315, 356 to 358.

E. Hoelzler et al. "Pulstechnik, Band II—Anwendungen und Systeme", $2^{nd}$ Edition, prepared by K. Euler et al.; Springer-Verlag, 1984, relevant pp. 257 to 266, 311 to 319.

Data Book of TEMIC Semiconductor GmbH, 2000, e5550; Revision A4, May 25, 2000; p. 319.

Data Book of TEMIC Semiconductor GmbH, 2000, e5551, Revision A2, Apr. 19, 2000; p. 333.

* cited by examiner

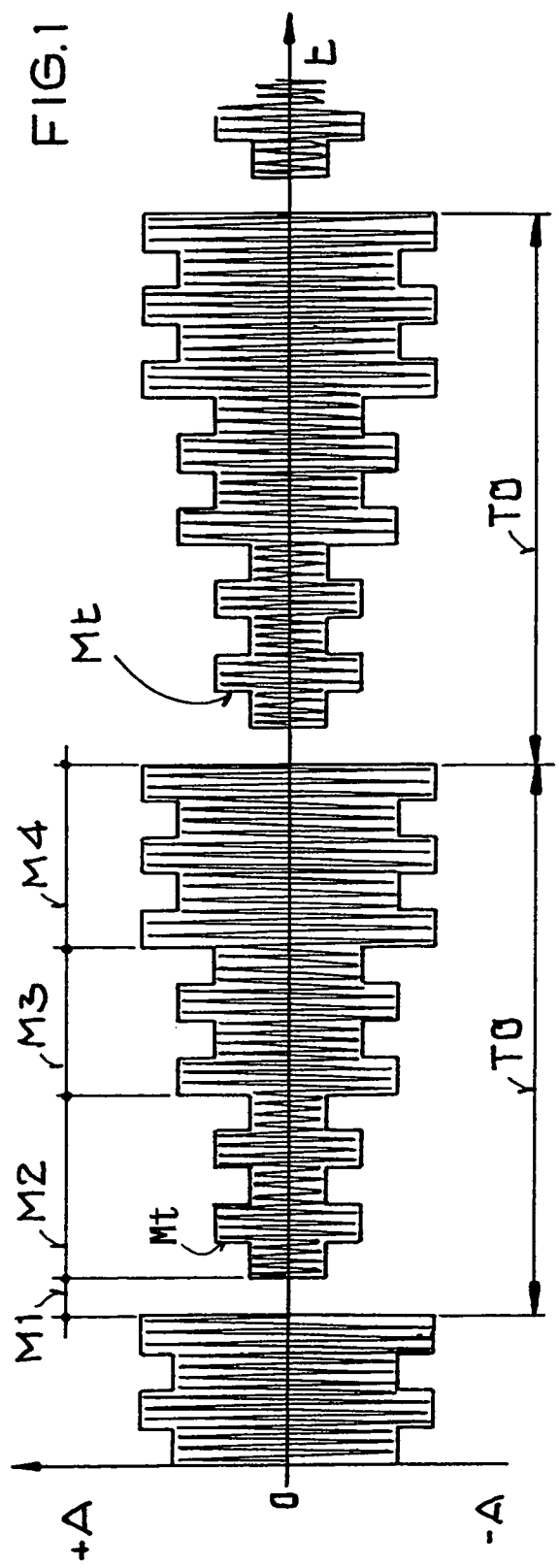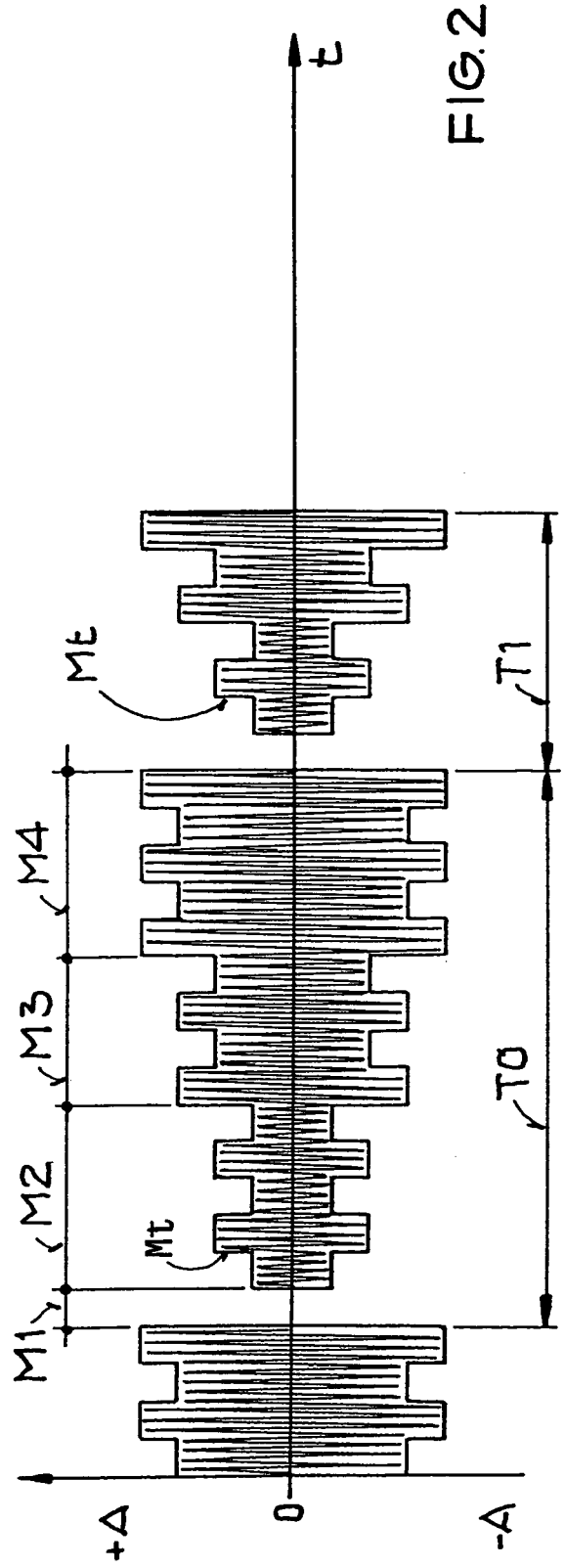

METHOD FOR TRANSMITTING A PLURALITY OF INFORMATION SYMBOLS

CROSS-REFERENCE TO RELATED APPLICATION

This application is related to U.S. patent application Ser. No. 10/132,956, filed on Apr. 26, 2002, of the same Assignee as the present application.

BACKGROUND

1. Field of the Invention

The present invention relates to a method for transmitting information symbols between a first transceiver and a second transceiver by modulating a carrier signal.

2. Description of the Related Technology

The types of information are designated by the term information symbol. Examples of types of information, in addition to the actual digital data words, are control signals such as clock information. In previous methods of contactless communication, the types of information are coded and digitally transmitted in the form of data words by means of modulating a carrier wave. An important area of application for this is the area of contactless identification, in which particularly transponder technology is used. These systems consist of a transponder, which is frequently integrated into a keyring pendant or a so-called smart card, and a stationary base unit which, in the case of applications in the automotive field, is fitted in an automobile. The communication between transponder and base unit is based upon an inductive coupling, in which the data is transmitted by means of a modulated carrier wave. Particularly in applications in the automotive field, the complete authentication between base station and transponder must be completed within a period of some 100 ms so that the user does not notice any delay. The information must be transmitted between transponder and base station at a high data rate in order to implement the ever higher security requirements for the authentication process. This requirement is difficult to fulfill, especially in so-called passive systems in which the transponder does not have its own power supply, and has to obtain all its energy from the electromagnetic field of the base station by means of absorption modulation. To do this, the transponder has to be located in the electromagnetic near-field region of the base station in order to be able to absorb enough energy because the inductive coupling is low in the medium air. As the near-field region is substantially larger at low frequencies, the carrier frequencies lie in the range around 20 MHz in passive systems, which enables a range of a few cm to be attained.

Methods which function according to the previous state of the art are described, for example, for passive transponder systems in the data book of TEMIC Semiconductor GmbH, 2000, p. 319 and p. 333. In this method, all types of information are coded in the form of data words, and modulated in digitized form upon a carrier frequency. In order to decode this information in the data words, a system clock, which is gained from the carrier frequency by using dividing stages, is required in the transponder system.

The disadvantage of previous methods is that, in order to be able to decode the information contained in the data words in the receiving station, additional digital data (overhead) has to be generated by coding all types of information in the form of data words based on a protocol. This lowers the data transmission rate correspondingly. This results in additional waiting time for decoding the transmitted information, which is disturbing in time-critical applications. Another disadvantage of the previous method is that, in passive systems for decoding the transmitted data words, the system clock is derived from the frequency of the carrier with the aid of a dividing stage. With a frequency in the 20 MHz range, the dividing stage has to switch frequently within the transponder in order to generate the system clock and, in combination with the further switchover for clock generation, requires a considerable proportion of the energy which is gained by absorption modulation from the field of the base station. This substantially reduces the communication distance between base unit and transponder.

SUMMARY OF THE INVENTION

The object of the present invention is to provide a method which increases the data rate of wireless communication, and which can replace the clock generation logic in the case of passive transponder systems.

This object is solved in accordance with the invention in a method of the type mentioned above, for transmitting information symbols between two transceivers by modulating and transmitting a carrier signal.

According to this, the essence of the invention is, in the case of communication between a first transceiver and a second transceiver, to transmit various information symbols by means of a single carrier wave, in which different modulation indices are assigned to the individual information symbols in the first transceiver, and so to modulate the carrier wave in such a manner that at least one of the characteristic physical parameters of the carrier signal is changed in the first transceiver. As well as a frequency modulation and a phase modulation, the method according to the invention can be particularly advantageously implemented by means of an amplitude modulation.

The advantage over the prior state of the art is that, by transmitting differing information symbols, the information types only have to be partially coded in the form of data words, and this enables the data rate to be substantially increased. As well as the coded data words, additional control signals can also be transmitted directly by a carrier wave.

In an embodiment of the method according to the invention, it is possible to modulate the individual information symbols on the carrier wave with a time-shift. The number of possible information symbols which can be transmitted by a carrier wave is substantially a function of the second transceiver's sensitivity for separating them on the basis of the different modulation amplitudes.

In another development of the method according to the invention, it is possible to modulate a plurality of information symbols simultaneously on a carrier wave in order to increase the data rate even further. In order to make the separation of a plurality of information symbols easier in the second transceiver, it is advantageous if the spacings of the values between two adjacent modulation indices are of equal size, or if the value of the modulation index of the nth information symbol differs from the value of the modulation index of the (n+x)th information symbol by a constant factor which has, for example, the value 2.

In another development of the method according to the invention, the superimposition of information symbols, as well as the time-shifted modulation of the information symbols can be combined with successive carrier frequency periods of differing length. The advantage of this is the possibility of increasing the total number of information symbols transmitted by a carrier wave without reducing the spacing between the values of the modulation indices too much for simple separation in the second transceiver. Compared with the prior state of the art, the method thus enables a multitude of information symbols to be transmitted on a carrier wave in a simple and inexpensive manner. It is irrelevant to the method whether the communication is unidirectional or bidirectional.

If, for example, a separate modulation index is assigned as an information symbol to a clock information, with the new method a system frequency for decoding the data words, for example, can also be transmitted together with the data words by a carrier wave. This enables the second transceiver to be controlled by the first transceiver in a particularly simple manner by synchronizing the second transceiver with the first transceiver. In a further development, the data rate can be variably set without coding with data words. Investigations by the applicant have shown that it is advantageous to assign a smaller modulation index to the clock signal than to the data signal.

The new method can be particularly advantageously used to replace the electronic switching for clock generation in the second transceiver. The energy consumption is substantially reduced, especially in passive systems, because the system clock is no longer generated by dividing stages and an integrated circuit in the second transceiver. This increases the maximum possible communication distance between transponder and base station. Accordingly, substantially higher carrier frequencies with correspondingly higher data rates can be used, which result in very short times for transmitting a plurality of information symbols, even for complicated authentication processes.

BRIEF DESCRIPTION OF THE FIGURES

The invention is shown and explained in the following by means of an embodiment in conjunction with a drawing. It shows:

FIG. 1 A carrier wave which has a plurality of modulation indices and period lengths of equal size, FIG. 2 A carrier wave which, in addition to a plurality of modulation indices, has different period lengths.

DESCRIPTION OF THE PREFERRED EMBODIMENTS

FIG. 1 shows an embodiment of the method according to the invention in which a carrier wave transmits various information symbols. To do this, the amplitude A of the illustrated carrier wave is modulated in a first transceiver (not shown) by a different modulation index being assigned to each of a first information symbol M1, a second information symbol M2, a third information symbol M3 and a fourth information symbol M4. For reasons of clarity, the arrangement of the modulation indices has been selected so that the values continually fall from M1 to M4. However, any other sequence of modulation indices is also possible. In comparison to the other information symbols, M2 to M4, information symbol M1 is distinguished by having a modulation index of 100%. During this time, which is also designated as a field gap, the second transceiver cannot absorb any energy from the field. Because of its special position, it is advantageous to use this information symbol for synchronizing the data transmission. As the other information symbols do not have modulation indices of 100%, it is possible to superimpose a further information symbol Mt with a substantially lower modulation index, to which, for example, clock information may be assigned, on these information symbols. The transmission of the clock information enables the transmitted information symbols to be decoded in the second transceiver without this having its own logic for generating the system clock. Moreover, for clarity of illustration, the same bit patterns are transmitted within the individual information symbols in the two successive periods, which have a period length of t0.

FIG. 2 shows a development of the embodiment shown in FIG. 1 in which, in addition to the four different modulation indices of the information symbols M1, M2, M3 and M4 and the modulation index for the clock information Mt, the period lengths t0 and t1 are also varied. This enables another information symbol to be transmitted by a carrier wave.

What is claimed is:

1. A method for transmitting a plurality of different information symbols between a first transceiver and a second transceiver by modulating a carrier signal, wherein
   a different modulation index is assigned to each one of the different information symbols, each of the information symbols conveying different type data, and the modulation indices identifying a type of the conveyed data based on an amplitude of the amplitude modulation index,
   at least one characteristic physical variable of the carrier signal is modulated in accordance with the different modulation indices assigned respectively to the different information symbols that are modulated onto the carrier signal to produce a modulated signal, and
   the modulated signal is transmitted from the first transceiver to the second transceiver, and the second transceiver evaluates the modulated signal to obtain the conveyed different types of data.

2. The method according to claim 1, wherein, alongside frequency and phase, amplitude (A) is modulated as the characteristic physical variable of the carrier signal.

3. The method according to claim 1, wherein nth information symbol is transmitted with a time-shift from (n+1)th information symbol.

4. The method according to claim 1, comprising simultaneously transmitting a selected one (n) of the different information symbols and a subsequent one (n+x) of the information different symbols that follows the selected one of the different information symbols.

5. The method according to claim 1, wherein not only the modulation indices but also respective period lengths of modulation, periods differ respectively from one another to define additional information symbols.

6. The method according to claim 1, wherein the first transceiver controls the second transceiver by at least one control signal, being a clock signal assigned to an information symbol.

7. A method for transmitting a plurality of different information symbols between a first transceiver and a second transceiver by modulating a carrier signal, wherein
   a different modulation index is assigned to each one of the different information symbols,
   at least one characteristic physical variable of the carrier signal is amplitude modulated in accordance with the different modulation indices assigned respectively to the information symbols that are modulated onto the carrier signal, and
   at least one of the different information symbols includes data for a control signal for setting a data rate for a data transmission of the modulated carrier signal by the first transceiver, and the modulation index including the data of the control signal is smaller than the modulation index of a data signal formed by others of said different information symbols.

8. The method according to claim 6, wherein the second transceiver has no electronic circuit for clock generation and is a passive transponder that uses the clock signal for local clocking.

9. A method of producing and transmitting a modulated information signal from a first device to a second device, comprising the steps:
   a) defining plural different information symbols;
   b) assigning plural different modulation indices respectively individually to each of said different information symbols, wherein said modulation indices differ from one another;
   c) representing information items, which are to be transmitted, with said information symbols, wherein said modulation indices respectively assigned to each of said different information symbols identify said information items based on an amplitude of each of said modulation indices;
   d) modulating said different information symbols onto a carrier signal, comprising modulating a characteristic physical parameter of said carrier signal in accordance with said different modulation indices respectively assigned to said information symbols, to produce a modulated information signal;
   e) transmitting said modulated information signal from said first device to said second device; and
   f) in said second device, evaluating said modulated information signal to obtain said information items and additional information.

10. The method according to claim 9, wherein said different information symbols include first and second information symbols, and said modulation indices include first and second modulation indices that differ from one another and that are respectively assigned to said first and second information symbols.

11. The method according to claim 10, wherein said different information symbols further include a third information symbol, and said modulation indices further include a third modulation index that differs from said first and second modulation indices and that is assigned to said third information symbol.

12. The method according to claim 11, wherein said different information symbols further include a fourth information symbol, and said modulation indices further include a fourth modulation index that differs from said first, second and third modulation indices and that is assigned to said fourth information symbol.

13. The method according to claim 10, wherein said first and second information symbols respectively have different durations relative to one another.

14. The method according to claim 10, wherein said first and second information symbols respectively have different numbers and/or different patterns of modulation pulses relative to one another.

15. The method according to claim 9, wherein said different modulation indices respectively have predefined modulation index values that differ from one another by predefined differences that can be detected and differentiated between by said second device.

16. The method according to claim 9, wherein said information symbols respectively having said different modulation indices assigned thereto respectively represent different types of said information items that are to be transmitted, and said additional information represented by said different modulation indices respectively identifies said different types of said information items.

17. The method according to claim 9, wherein said characteristic physical parameter of said carrier signal being modulated in said step d) comprises a frequency or a phase of said carrier signal.

18. The method according to claim 9, wherein said characteristic physical parameter of said carrier signal being modulated in said step d) comprises an amplitude of said carrier signal.

19. The method according to claim 18, wherein said different modulation indices give rise to respective different maximum amplitudes and a consistent amplitude modulation swing of said respective information symbols modulated in said modulated information signal.

20. The method according to claim 9, wherein said information symbols are modulated in succession respectively in successive time intervals one after another in said modulated information signal.

21. The method according to claim 9, further comprising defining an additional information symbol and modulating said additional information symbol onto said carrier wave simultaneously with at least a selected one of said information symbols defined in said step a) by superimposing said additional information symbol thereon in said modulated information signal.

22. The method according to claim 9, wherein said step d) comprises modulating said information symbols successively in respective successive time intervals onto said carrier signal, with one or more of said successive time intervals respectively defining respective successive signal periods bounded between field gaps in said modulated information signal, and further comprising defining further information symbols that are respectively assigned respective ones of said signal periods having respective different time durations and that represent further information in said signal periods having said different time durations.

23. The method according to claim 9, wherein at least one of said different information symbols represents a control signal, and further comprising receiving said control signal in said modulated information signal in said second device and controlling said second device responsively to said control signal.

24. The method according to claim 23, wherein said second device is a passive transponder that does not include a local clocking signal generator circuit, wherein said control signal is a clock signal, and said controlling of said second device comprises controlling a local docking of said second device in response to said clock signal.

25. The method according to claim 1, wherein the additional information identifies respective data types of the respective data conveyed by the information symbols.

26. A method of transmitting a plurality of information symbols between a first transceiver and a second transceiver by modulating a carrier signal, the method comprising:
   assigning an amplitude modulation index to a first information symbol of the plurality of information symbols, wherein the first information symbol conveys a first type of data, and wherein the amplitude modulation index identifies a type of the conveyed data of the first information symbol based on an amplitude of the amplitude modulation index;
   assigning a different amplitude modulation index and a different period length of a modulation period to a second information symbol of the plurality of information symbols, wherein the second information symbol conveys a second type of data different from said first type, and wherein the different amplitude modulation index and the different period length of the modulation period identifies a type of the conveyed data of the second information symbol based on an amplitude of the different amplitude modulation index;

modulating at least one characteristic physical variable of the carrier signal in accordance with the different amplitude modulation index assigned respectively to each of the plurality of information symbols that are modulated onto the carrier signal to produce a modulated signal;

transmitting the modulated signal from the first transceiver to the second transceiver; and evaluating the modulated signal at the second transceiver to obtain the conveyed data.

\* \* \* \* \*